US012680591B2

(12) United States Patent
Wang et al.

(10) Patent No.: US 12,680,591 B2
(45) Date of Patent: Jul. 14, 2026

(54) SHOCK ABSORBER FOR AUTOMOBILE WITH ADAPTIVE DAMPING

(71) Applicant: BAODING DONGLI MACHINERY CO., LTD, Baoding (CN)

(72) Inventors: Zheng Wang, Baoding (CN); Dongbo Wang, Baoding (CN); Hui Li, Baoding (CN); Zhengli Tian, Baoding (CN); Shaonan Gu, Baoding (CN); Guang Gu, Baoding (CN); Wensheng Zhang, Baoding (CN); Mingkai Yu, Baoding (CN); Xun Zhang, Baoding (CN)

(73) Assignee: BAODING DONGLI MACHINERY CO., LTD, Baoding (CN)

( * ) Notice: Subject to any disclaimer, the term of this patent is extended or adjusted under 35 U.S.C. 154(b) by 651 days.

(21) Appl. No.: 18/265,985

(22) PCT Filed: Dec. 31, 2021

(86) PCT No.: PCT/CN2021/143926
§ 371 (c)(1),
(2) Date: Jun. 8, 2023

(87) PCT Pub. No.: WO2022/156518
PCT Pub. Date: Jul. 28, 2022

(65) Prior Publication Data
US 2024/0052905 A1    Feb. 15, 2024

(30) Foreign Application Priority Data

Jan. 22, 2021    (CN) ........................ 202110087226.X

(51) Int. Cl.
*F16F 9/06*        (2006.01)
*F16F 9/32*        (2006.01)
(Continued)

(52) U.S. Cl.
CPC ............ *F16F 9/061* (2013.01); *F16F 9/3221* (2013.01); *F16F 9/3482* (2013.01); *F16F 9/516* (2013.01)

(58) Field of Classification Search
CPC .......... F16F 9/061; F16F 9/062; F16F 9/3207; F16F 9/3221; F16F 9/34; F16F 9/346
See application file for complete search history.

(56) References Cited

U.S. PATENT DOCUMENTS

| 2,672,952 A | * | 3/1954 | Smith | ..................... F16F 9/362 |
| | | | | 188/313 |
| 2009/0145706 A1 | * | 6/2009 | Sintorn | ................ B60G 15/061 |
| | | | | 188/266.2 |
| 2017/0350466 A1 | * | 12/2017 | Böhrer | .................... F16F 9/062 |

FOREIGN PATENT DOCUMENTS

| CN | 107218017 A | * | 9/2017 | ............ F16F 13/002 |
| CN | 108571555 A | | 9/2018 | |

(Continued)

*Primary Examiner* — Vishal R Sahni
(74) *Attorney, Agent, or Firm* — Bayramoglu Law Offices LLC

(57) ABSTRACT

A shock absorber for an automobile with adaptive damping includes a cylinder barrel, a piston rod, a damping valve, a nitrogen container and a flute tube assembly. The flute tube assembly includes a core tube socket, an inner tube and an outer tube. A row of damping through holes is formed in each of two ends of the outer tube, a first check valve is arranged at one end of the outer tube and inserted into the piston rod, and the other end of the outer tube is arranged on the core tube socket and is connected to the nitrogen container through a first oil tube pipeline; the core tube socket is communicated with the first oil tube pipeline through a second check valve; the bottom end of the inner tube is fixed to the core tube socket and connected to the nitrogen container through a second oil tube pipeline.

8 Claims, 6 Drawing Sheets

(51) Int. Cl.
  *F16F 9/348*       (2006.01)
  *F16F 9/516*       (2006.01)

(56)                References Cited

FOREIGN PATENT DOCUMENTS

| | | | | |
|---|---|---|---|---|
| CN | 108757814 A | | 11/2018 | |
| CN | 109854664 A | * | 6/2019 | |
| CN | 112727978 A | * | 4/2021 | .............. F16F 9/061 |
| CN | 114838081 A | * | 8/2022 | ................ F16F 9/43 |
| JP | 2009014019 A | | 1/2009 | |

* cited by examiner

SHOCK ABSORBER FOR AUTOMOBILE WITH ADAPTIVE DAMPING

CROSS REFERENCE TO THE RELATED APPLICATIONS

This application is the national phase entry of International Application No. PCT/CN2021/143926, filed on Dec. 31, 2021, which is based upon and claims priority to Chinese Patent Application No. 202110087226.X, filed on Jan. 22, 2021, the entire contents of which are incorporated herein by reference.

TECHNICAL FIELD

The present invention relates to the field of shock absorbers for automobiles, and particularly relates to a shock absorber for an automobile with adaptive damping.

BACKGROUND

With improvement of people's living standards, what is pursued to drive an off-road vehicle on a paved road is the comfortability in the driving process, and what is pursued to drive on an unpaved road is the stability and passing capacity in the driving process. When an automobile is running on a road, with changes of pit holes in the pavement, vehicle wheels supported by a suspension stretch out and draw back and generate relative change in axial position on a piston rod of a shock absorber as well. The greater the change of the relative position is, the more severe the bumpiness of the automobile becomes. To make driver and passengers feel comfortable, greater damping is needed. Meanwhile, change of the damping value is expected to be synchronized with change of pit holes in the pavement. However, the damping value of existing shock absorber is fixed. The integral damping strength of the shock absorber is adjusted by artificially pre-judging the road condition, and the driver needs to get off to rotatably adjust the rotary knob, which is quite inconvenient. Even if the damping strength is adjusted by an electric control motor, it is only a relatively fixed damping value. Change of the road condition cannot be kept synchronized with the damping value at any time.

SUMMARY

To achieve the above objective, the present invention provides a shock absorber for an automobile with adaptive damping, including a cylinder barrel, a piston rod, a damping valve, a nitrogen container and a flute tube assembly, where the flute tube assembly includes a core tube socket, an inner tube and an outer tube. At least a row of damping through holes is formed in each of two ends of the outer tube, a first check valve is arranged at one end of the outer tube and is inserted into the piston rod, and the other end of the outer tube is arranged on the core tube socket and is connected to the nitrogen container through a first oil tube pipeline; the core tube socket is communicated with the first oil tube pipeline through a second check valve; the bottom end of the inner tube is fixed to the core tube socket and is connected to the nitrogen container through a second oil tube pipeline; the core tube socket is fixed to the bottom of the cylinder barrel; the damping valve is fixed to one end of the piston rod and is arranged in the cylinder barrel; and a sealing tube is fixed to one end of the piston rod, the other end of the piston rod penetrates through an end cap of the cylinder barrel, a lower lifting lug is arranged on the piston rod, and an upper lifting lug is fixed to the bottom of the cylinder barrel.

Preferably, the plurality of damping through holes with the same diameter are formed linearly at an equal interval.

Preferably, the plurality of damping through holes with gradually increased diameters from outside to inside are formed linearly at an equal interval. Preferably, the plurality of damping through holes with gradually increased intervals from outside to inside are formed linearly, the plurality of damping through holes being identical in diameter.

Preferably, the plurality of damping through holes are identical in diameter, and the plurality of damping through holes are spirally formed at an equal interval. Preferably, a bell mouth is arranged at the top end of the inner tube, the outer diameter of the bell mouth is equal to the inner diameter of the outer tube, and the length of the inner tube is within ⅔ to ⅓ of that of the outer tube.

Preferably, the length of the sealing tube is ⅓ of that of the outer tube, and the sealing tube is fixed inside the piston rod.

Preferably, the damping valve includes a damping valve body, a compression damping mechanism, a stretching damping mechanism and a locking nut; the compression damping mechanism and the stretching damping mechanism are fixed to two sides of the damping valve body, respectively; the compression damping mechanism comprises a compression valve plate set and a compression baffle; the stretching damping mechanism includes a stretching valve plate set and a stretching baffle; and a guidance tape is fixed to the outer side of the damping valve body.

Therefore, the present invention provides a shock absorber for an automobile with adaptive damping adopting the above structure. Damping increases or decreases according to variables, so the damping of the automobile is adaptively adjusted in any road conditions. Change of damping valves is synchronized with change of the road condition, making the automobile be driven more smoothly and comfortably.

The technical solution of the present invention will be further described in detail below in combination with drawings and embodiments.

NUMERALS IN DRAWINGS 1, piston rod; 11, lower lifting lug; 2, cylinder barrel; 21, end cap; 22, anti-collision damping ring; 23, upper lifting lug. 3, damping valve; 31, damping valve body; 32, guidance tape; 33, compression valve plate set; 34, compression baffle; 35, stretching valve plate set; 36, stretching baffle; 37, locking nut; 4, sealing tube; 5, core tube socket; 51, second check valve; 6, outer tube; 61, damping through hole; 62, first check valve; 7, inner tube; 71, bell mouth; 8, nitrogen container; 81, first oil tube pipeline; and 82, second oil tube pipeline.

DETAILED DESCRIPTION OF THE EMBODIMENTS

Embodiment 1

Figure 1:
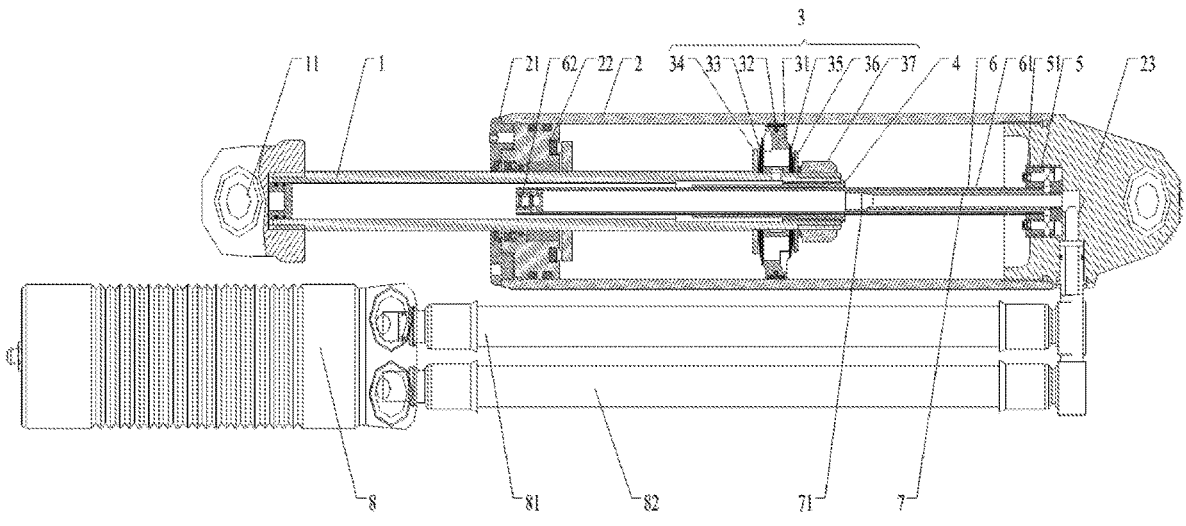
FIG. 1 is a schematic structural diagram of a shock absorber for an automobile with adaptive damping provided by the present invention.
Figure 2:
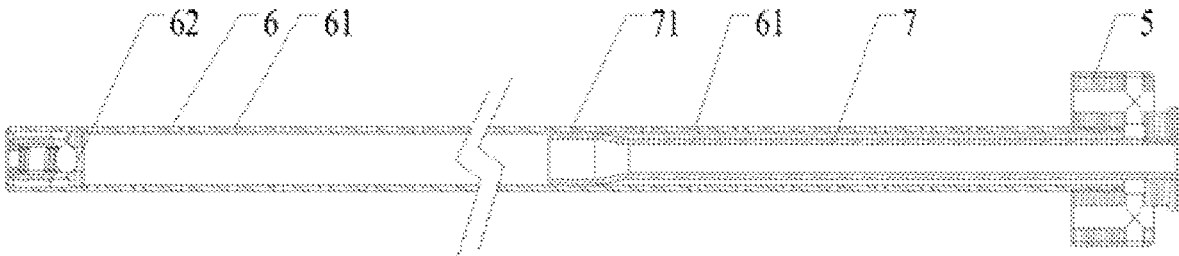
FIG. 2 is a schematic structural diagram of a flute tube assembly provided by the present invention.
Figure 3:
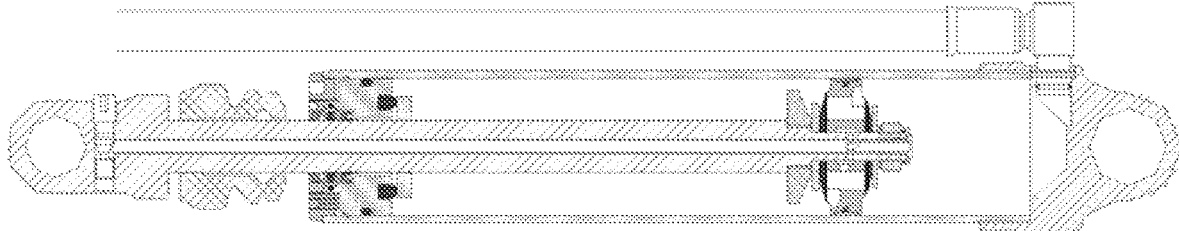
FIG. 3 is a partially schematic structural diagram of an existing shock absorber.
Figure 4:
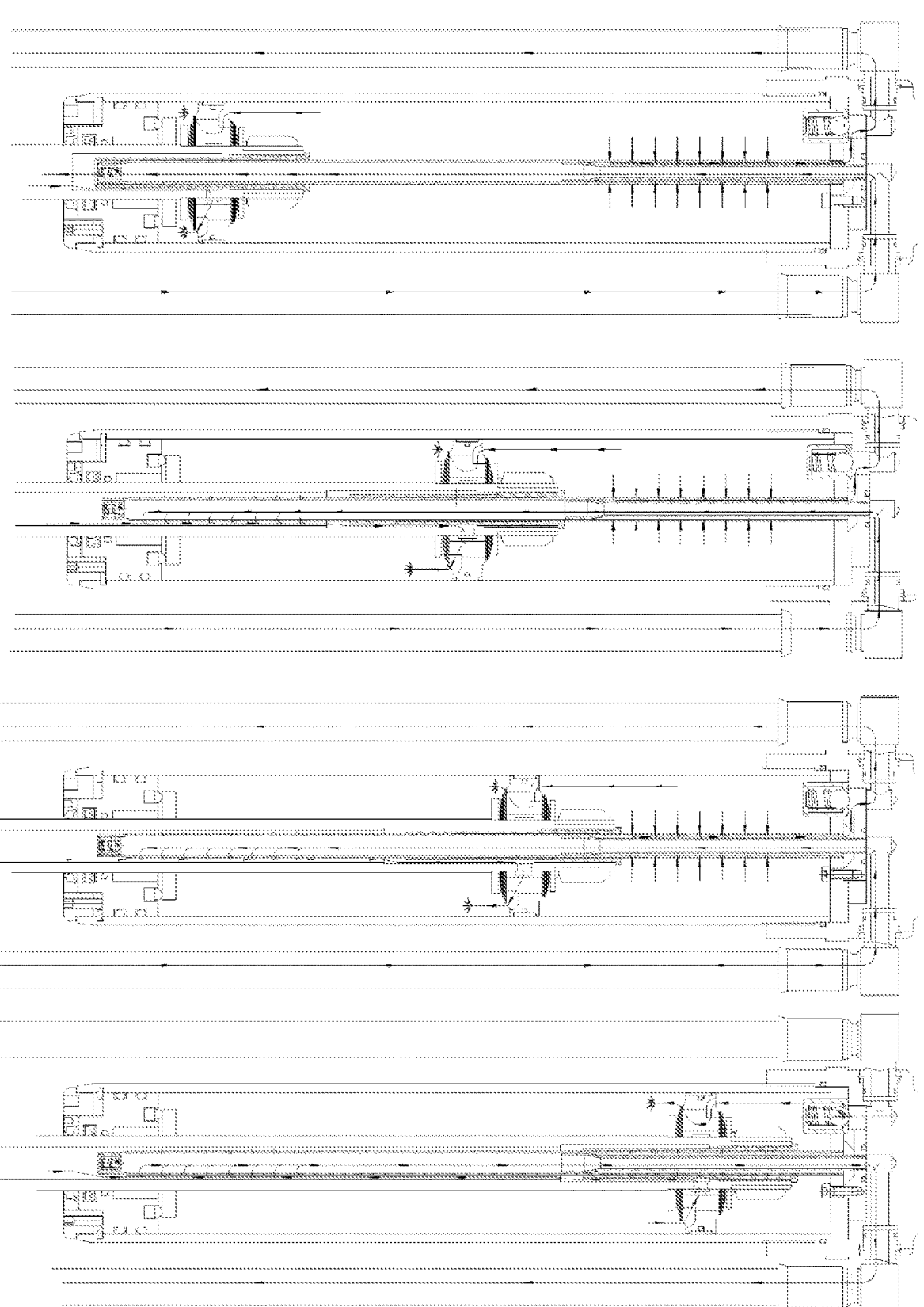
FIG. 4 is an oil circuit diagram of the present invention during compression.
Figure 5:
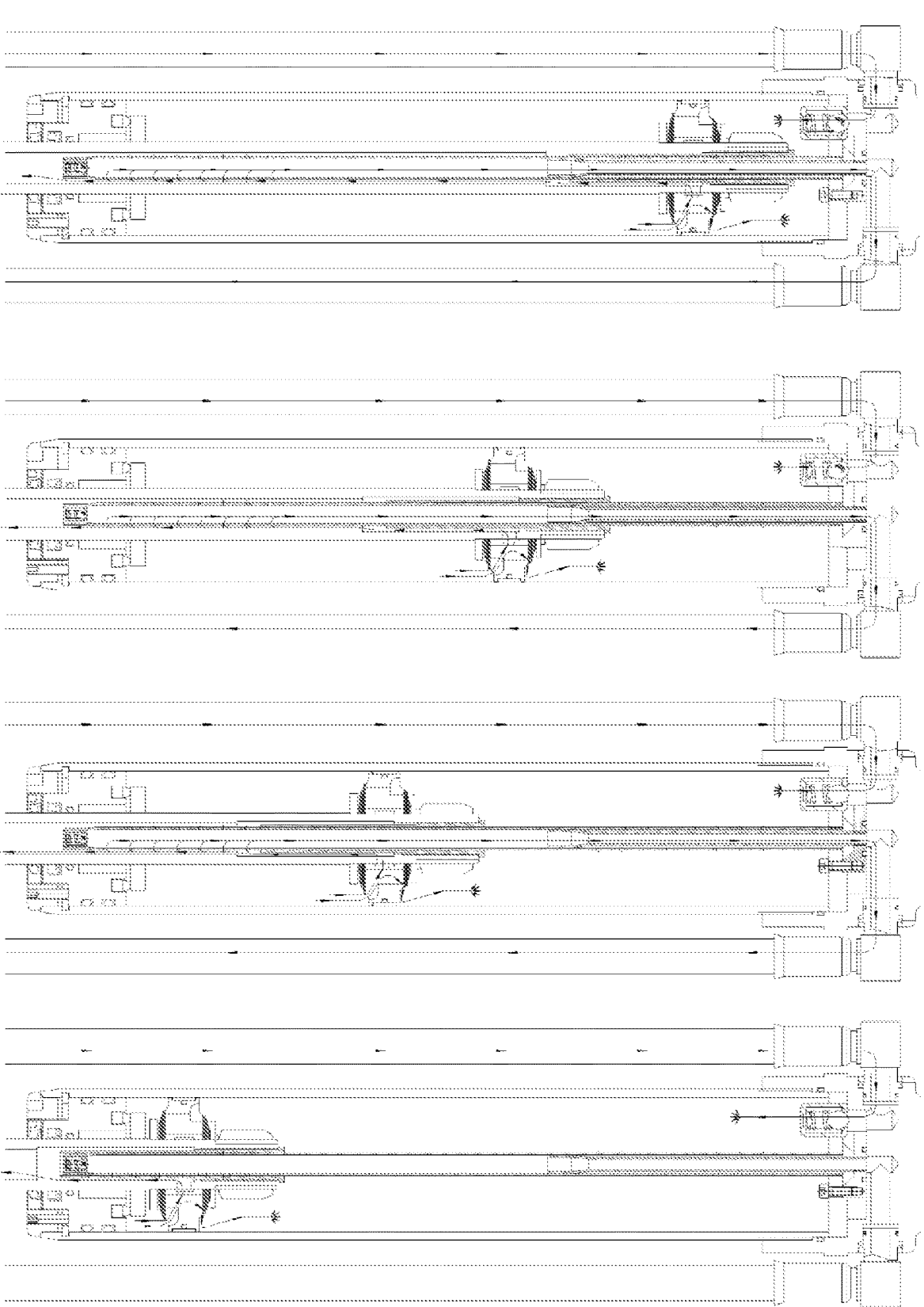
FIG. 5 is an oil circuit diagram of the present invention during stretching.

FIG. 1 is a schematic structural diagram of a shock absorber for an automobile with adaptive damping provided by the present invention. FIG. 2 is a schematic structural diagram of a flute tube assembly provided by the present invention. FIG. 3 is a partially schematic structural diagram of an existing shock absorber. FIG. 4 is an oil circuit diagram of the present invention during compression. FIG. 5 is an oil circuit diagram of the present invention during stretching. As shown in the figures, a shock absorber for an automobile with adaptive damping includes a cylinder barrel 2, a piston rod 1, a damping valve 3 and a nitrogen container 8, and further includes a flute tube assembly arranged in the cylinder barrel 2, where the flute tube assembly includes a core tube socket 5, an inner tube 7 and an outer tube 6. At least a row of damping through holes 61 is formed in each of two ends of the outer tube 6. In the embodiment, the plurality of damping through holes 61 are formed linearly at an equal interval with same diameter. A first check valve 62 is arranged at one end of the outer tube 6 and is inserted into the piston rod 1, so that oil can flow outwards from the outer tube 6 but cannot flow into the outer tube 6 from outside to inside. The other end of the outer tube 6 is arranged on the core tube socket 5 and is connected to the nitrogen container 8 through a first oil tube pipeline 81; the core tube socket 5 is communicated with the first oil tube pipeline 81 through a second check valve 51; an inner tube 7 is arranged inside the outer tube 6; a bell mouth 71 is arranged at the top end of the inner tube 7; the length of the inner tube 7 is within ⅔ to ⅓ of that of the outer tube 6; the outer diameter of the bell mouth 71 is equal to the inner diameter of the outer tube 6, so that a first cavity is formed between the end of the outer tube 6 close to the core tube socket 5 and the inner tube 7. The bottom end of the inner tube 7 is fixed to the core tube socket 5 and is connected to the nitrogen container 8 through a second oil tube pipeline 82; and the core tube socket 5 is fixed to the bottom of the cylinder barrel 2. The damping valve 3 is fixed to one end of the piston rod 1 and is arranged in the cylinder barrel 2; and a sealing tube 4 is fixed to one end of the piston rod 1; the length of the sealing tube 4 is ⅓ of that of the outer tube; and the sealing tube 4 is fixed inside the piston rod 1. The sealing tube 4, with movement of the piston rod 1, is configured to plug the damping through holes 61 in the outer rube 6. The damping valve 3 includes a damping valve body 31, a compression damping mechanism, a stretching damping mechanism and a locking nut 37. The compression damping mechanism and the stretching damping mechanism are fixed to two sides of the damping valve body 31, respectively; the compression damping mechanism includes a compression valve plate set 33 and a compression baffle 34; the stretching damping mechanism includes a stretching valve plate set 35 and a stretching baffle 36; and a guidance tape 32 is fixed to the outer side of the damping valve body 31. During compression or stretching, the compression valve plate set or the stretching valve plate set deform, so that oil can pass through the damping valve body. The other end of the piston rod 1 penetrates through an end cap of the cylinder barrel 2, a lower lifting lug 11 is arranged on the piston rod, and an upper lifting lug 23 is fixed to the bottom of the cylinder barrel 2.

A Compression Process is as Follows:

When the piston rod 1 moves inwards, the sealing tube 4 plugs the damping through holes 61 in the left end of the outer tube 6, and the compression valve plate set deforms, so that hydraulic oil flows to the left side from the right side of the damping valve, and meanwhile, the hydraulic oil enters the first cavity through the plurality of damping through holes in the right end and then enters the nitrogen container through the first oil tube pipeline 81. The hydraulic oil in the nitrogen container enters the inner tube 7 through the second oil tube pipeline 82, enters the piston rod 1 through the first check valve, flows through the damping valve and enters the cylinder barrel 2 on the left side of the damping valve; with increase of deformation, the sealing tube 4 is away from the damping through holes in the left end, so that the hydraulic oil flows through the damping valve through the damping through holes in the left side and enters the cylinder barrel 2 on the left side of the damping valve; and when the sealing tube 4 plugs the damping through holes in the right side, with decrease of the damping through holes in the right side, the damping increases gradually. The amplitude of the damping is adaptively adjusted with the amplitude of the deformation.

A Stretching Process is as Follows:

When the piston rod 1 stretches, the hydraulic oil in the nitrogen container enters the right side of the damping valve 3 quickly through the second check valve 51, and meanwhile, the stretching valve plate set deforms. The hydraulic oil on the left side enters the right side from the left side through the damping valve, so that the shock absorber responds rapidly to return to an initial position quickly when the automobile is suspended. With movement of the sealing tube 4, the damping through holes in the left side are covered and plugged gradually, so that the damping increases gradually. The amplitude of the damping is adaptively adjusted with the amplitude of the deformation.

Embodiment 2

Figures 6, 7, 8:
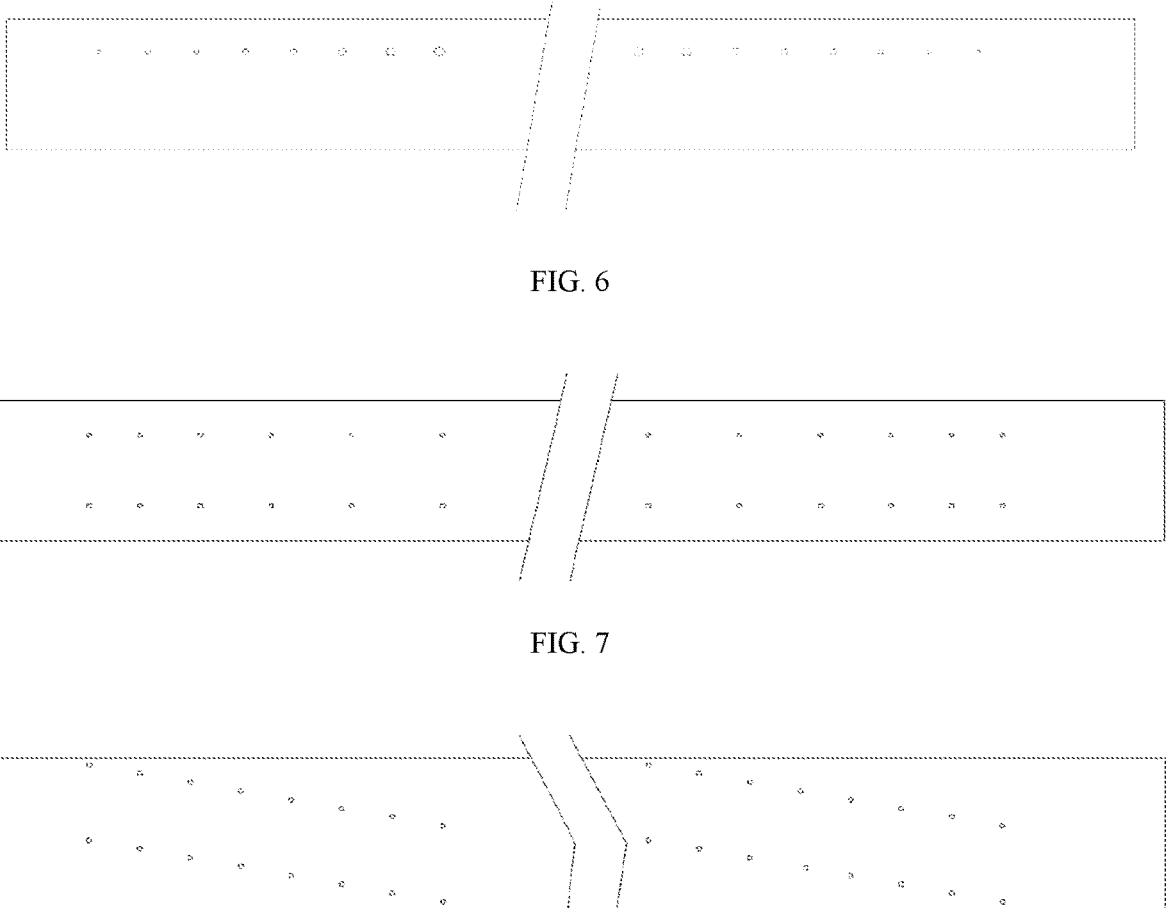
FIG. 6 is a schematic structural diagram of an outer tube in the embodiment 2 of the present invention.
FIG. 7 is a schematic structural diagram of an outer tube in the embodiment 3 of the present invention.
FIG. 8 is a schematic structural diagram of an outer tube in the embodiment 4 of the present invention.

The difference between the embodiment and the embodiment 1 lies in that the plurality of damping through holes are formed linearly at an equal interval with gradually increased diameters from outside to inside, as shown in FIG. 6.

Example 3

The difference between the embodiment and the embodiment 1 lies in that the plurality of damping through holes are formed linearly at an equal interval with gradually increased diameters from outside to inside, the plurality of damping through holes being identical in diameter, as shown in FIG. 7.

Embodiment 4

The difference between the embodiment and the embodiment 1 lies in that the plurality of damping through holes are identical in diameter, and the plurality of damping through holes are spirally formed at an equal interval, as shown in FIG. 8.

Therefore, the present invention provides a shock absorber for an automobile with adaptive damping adopting the above structure. Damping increases or decreases according to variables, so the damping of the automobile is adaptively adjusted in any road conditions, making the automobile be driven more smoothly and comfortably.

Finally, it shall be noted that the above embodiments are only used to explain the technical solution of the present invention and shall not be construed as a limitation thereto. Although the present invention is described in detail with reference to preferred embodiments, those of ordinary skill in the art shall understand that they still can modify or equivalently substitute the technical solution of the present invention. These modifications or equivalent substitutions do not deviate the modified technical solution from the spirit and scope of the technical solution of the present invention.

What is claimed is:

1. A shock absorber for an automobile with adaptive damping, comprising a cylinder barrel, a piston rod, a damping valve, a nitrogen container and a flute tube assembly, wherein the flute tube assembly comprises a core tube socket, an inner tube and an outer tube; at least one row of damping through holes are formed in each of two ends of the outer tube, a first check valve is arranged at a first end of the outer tube and is inserted into the piston rod, and a second end of the outer tube is arranged on the core tube socket and is connected to the nitrogen container through a first oil tube pipeline; the core tube socket is communicated with the first oil tube pipeline through a second check valve; a bottom end of the inner tube is fixed to the core tube socket and is connected to the nitrogen container through a second oil tube pipeline; the core tube socket is fixed to a bottom of the cylinder barrel; the damping valve is fixed to a first end of the piston rod and is arranged in the cylinder barrel; and a sealing tube is fixed to the first end of the piston rod, a second end of the piston rod penetrates through an end cap of the cylinder barrel, a lower lifting lug is arranged on the piston rod, and an upper lifting lug is fixed to the bottom of the cylinder barrel.

2. The shock absorber for the automobile with adaptive damping according to claim 1, wherein the plurality of damping through holes with a same diameter are formed linearly at an equal interval.

3. The shock absorber for the automobile with adaptive damping according to claim 1, wherein the plurality of damping through holes with gradually increased diameters from outside to inside are formed linearly at an equal interval.

4. The shock absorber for the automobile with adaptive damping according to claim 1, wherein the plurality of damping through holes with gradually increased intervals from outside to inside are formed linearly, the plurality of damping through holes being identical in diameter.

5. The shock absorber for the automobile with adaptive damping according to claim 1, wherein the plurality of damping through holes are identical in diameter, and the plurality of damping through holes are spirally formed at an equal interval.

6. The shock absorber for the automobile with adaptive damping according to claim 1, wherein a bell mouth is arranged at a top end of the inner tube, an outer diameter of the bell mouth is equal to an inner diameter of the outer tube, and a length of the inner tube is within $\frac{2}{3}$ to $\frac{1}{3}$ of a length of the outer tube.

7. The shock absorber for the automobile with adaptive damping according to claim 6, wherein a length of the sealing tube is $\frac{1}{3}$ of the length of the outer tube, and the sealing tube is fixed inside the piston rod.

8. The shock absorber for the automobile with adaptive damping according to claim 1, wherein the damping valve comprises a damping valve body, a compression damping mechanism, a stretching damping mechanism and a locking nut; the compression damping mechanism and the stretching damping mechanism are fixed to two sides of the damping valve body, respectively; the compression damping mechanism comprises a compression valve plate set and a compression baffle; the stretching damping mechanism comprises a stretching valve plate set and a stretching baffle; and a guidance tape is fixed to an outer side of the damping valve body.

* * * * *